(12) United States Patent
McKay (10) Patent No.: US 8,312,783 B2
(45) Date of Patent: Nov. 20, 2012

(54) AIRCRAFT FLIGHT CONTROL ACTUATION SYSTEM WITH DIRECT ACTING, FORCE LIMITING, ACTUATOR

(75) Inventor: Ted Alexander McKay, Foothill Ranch, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 614 days.

(21) Appl. No.: 12/527,334

(22) PCT Filed: Feb. 18, 2008

(86) PCT No.: PCT/US2008/054197
§ 371 (c)(1),
(2), (4) Date: Aug. 14, 2009

(87) PCT Pub. No.: WO2008/121451
PCT Pub. Date: Oct. 9, 2008

(65) Prior Publication Data
US 2010/0096498 A1 Apr. 22, 2010

Related U.S. Application Data

(60) Provisional application No. 60/890,203, filed on Feb. 16, 2007.

(51) Int. Cl.
*F16H 29/20* (2006.01)
(52) U.S. Cl. .............. 74/89.39; 244/99.2; 74/89.38; 74/89.23
(58) Field of Classification Search ........ 244/99.2–99.4, 244/231; 74/424.81, 424.82, 424.83, 424.84, 74/424.85, 424.86, 424.87, 424.88, 89.23, 74/89.37, 89.38, 89.39
See application file for complete search history.

(56) References Cited

U.S. PATENT DOCUMENTS

| | | | |
|---|---|---|---|
| 2,979,034 A | 4/1961 | Geyer | |
| 3,523,599 A | 8/1970 | Denkowski | |
| 3,726,370 A | 4/1973 | Hubbard, Jr. | |
| 4,094,387 A | 6/1978 | Pelat et al. | |
| 4,287,969 A | 9/1981 | Misumi et al. | |
| 4,459,867 A | 7/1984 | Jones | |
| 5,353,901 A | 10/1994 | Jacques et al. | |
| 5,582,390 A | 12/1996 | Russ | |
| 5,655,636 A | 8/1997 | Lang et al. | |
| 5,743,490 A | 4/1998 | Gillingham et al. | |
| 6,196,361 B1 | 3/2001 | Russ et al. | |
| 6,231,012 B1 | 5/2001 | Cacciola et al. | |

FOREIGN PATENT DOCUMENTS

| | | |
|---|---|---|
| DE | 90 05 288 | 7/1990 |
| GB | 912 759 | 12/1962 |
| GB | 2 379 490 | 3/2003 |
| JP | 2004-332759 | 11/2004 |

OTHER PUBLICATIONS

International Search Report and Written Opinion of corresponding International Application No. PCT/US2008/054197, dated Apr. 2, 2009.

*Primary Examiner* — Tien Dinh
*Assistant Examiner* — Nicholas McFall
(74) *Attorney, Agent, or Firm* — Renner, Otto, Boisselle & Sklar, LLP (57) ABSTRACT

A direct acting force limiting actuator wherein the actuator output force either directly or indirectly causes significant drag on a rotary input shaft rather than on the translating output member. Consequently, input energy is dissipated before the actuator gear train mechanical advantage amplifies the reaction forces.

15 Claims, 9 Drawing Sheets

AIRCRAFT FLIGHT CONTROL ACTUATION SYSTEM WITH DIRECT ACTING, FORCE LIMITING, ACTUATOR

RELATED APPLICATION

This application is a national phase of International Application No. PCT/US2008/054197 filed Feb. 18, 2009, published in English as WO 2008/121451, which claims the benefit of U.S. Provisional Application No. 60/890,203 filed Feb. 16, 2007, both of which are hereby incorporated by reference in their entirety.

FIELD OF THE INVENTION

The present invention relates to actuation systems, and more particularly to aircraft flight control actuation systems.

BACKGROUND

Modern aircraft wings often include a series of movable flight control surfaces, known as flaps or slats, that can be selectively extended or retracted to modify the lift producing characteristics of the wings. Extension and retraction of such flaps or slats is accomplished by a flight control actuation system mounted in the wing.

A typical actuation system includes a series of actuators spaced along the span of each wing, and operably connected to move one or more individual flight control surfaces. Adjacent actuators are connected to each other by drive shafts to form a chain of actuators and shafts extending along the span of the wing. A power drive unit (PDU) connected to the inboard end of the chain provides motive power for driving the actuators to selectively extend or retract the flight control surfaces.

Because control surfaces such as flaps or slats significantly alter the lift producing characteristics of the wings, the actuation systems have had features for reacting to problems such as jamming, or failure of one of the actuators or drive shafts in the aircraft flight control system. The actuators have included, for example, a force limiting device that limits the amount of force that can be applied to the control surface and further causes stalling of the PDU to prevent movement of the other control surfaces.

One known torque limiting device is disclosed in U.S. Pat. No. 4,459,867. The force limiting device forms part of an actuator wherein an input worm shaft is mechanically coupled by a worm gear and a ball and nut assembly to a linearly movable actuating member. A reciprocating reaction plate is secured for rotation with the actuating member. In operating cooperation with the reaction plate is a reaction plate engagement assembly that has elements secured against rotation relative to the housing. The elements are disposed on either side of the reaction plate. The elements have compression springs coupled thereto to resiliently separate the elements while allowing the elements to individually move towards and away from the reaction plate. The reaction plate, in turn, has springs resiliently positioning the reaction plate between a pair of force transmitting means in the form of snap rings secured to the actuating member whereby tension and compression forces above a predetermined value experienced by the actuating member result in the reaction plate being deflected into engagement with one of the reaction plate engagement elements depending upon the direction of the tension and compression forces experienced by the actuating member to thereby cause any additional input torque to be reacted into the housing. In this device, the reaction plate and related reaction plate components must be sized to accommodate the high torques being applied through the worm shaft and worm gear.

SUMMARY OF THE INVENTION

The present invention provides a direct acting force limiting actuator wherein the actuator output force either directly or indirectly causes significant drag on a rotary input shaft rather than on the translating output member. Consequently, input energy is dissipated before the actuator gear train mechanical advantage amplifies the reaction forces.

The use of output load acting on the translating output member to place drag on and ultimately lock the rotary input can be implemented in various ways. One way is to use the conforming shape of the worm gear to create friction with the worm shaft when the output load exceeds a pre-specified value. The worm gear and worm shaft are normally kept centered to one another during operation of the actuator under normal loads. When the load on the output member becomes excessive and exceeds the pre-specified value, the load causes the worm gear to translate relative to the worm shaft and cause the worm shaft to rub on the relatively displaced worm gear. This creates a friction drag on the worm shaft that can ultimately lock the input from imparting any further load on the output member.

In an alternative arrangement, hydraulics can be used to indirectly place a drag on the rotary input member using the load acting on the output member. The load on the actuator is applied through a piston that is movable in a cylinder. The movement of the piston is restrained, for example, by opposing pre-loaded spring elements that define a force trigger. When the load exceeds the trigger set point the piston displaces to cause fluid to move and displace a brake actuator member. Movement of the brake actuator member causes a brake coupled to the input to be engaged and thereby apply a braking force to the input shaft and eventually stall the input.

Still other ways are contemplated including the use of mechanical linkages between the output shaft and a brake acting on the input shaft.

Therefore, and according to one aspect of the invention, an actuator comprises an actuator housing; a linearly translating output member restrained by an actuating member mounted for rotation about an axis within a housing; a reversible rotary input member operatively coupled thru gears to the actuating member to cause the output member to translate along said axis in a direction dependent upon the direction of rotation of the rotary input member; and a force limiting device acting to dissipate input torque at the rotary input when axially directed tension or compressive forces acting on the output member are above a predetermined value.

In a preferred embodiment, a reduction in load magnitude at the output member results in deactivation of the force limiting device.

The force limiting device may create a friction drag on the rotary input member to prevent axially directed tension or compressive forces experienced by the output member from back-driving the rotary input member.

The actuating member may be mounted in the housing for limited axial movement relative to the rotary input member and biased by resilient forces to a centered position. Axial loads acting on the output member may cause the actuating member to shift when axially directed tension or compressive forces acting on the output member are above a predetermined value. Shifting of the actuating member may engage friction devices operative to apply a braking force to the rotary input member.

The rotary input device may be a worm shaft that is in mesh with a worm gear that causes rotation of the actuator member upon rotation of the worm gear, and the friction devices may include portions of the worm shaft and gear that frictionally engage when the actuating member is shifted by axially directed tension or compressive forces acting on the output member that are above a predetermined value.

In another embodiment, the tension or compressive forces acting on the output member may act on a fluid device to cause the fluid device to actuate a brake acting on the rotary input when the tension or compressive forces acting on the output member exceed the predetermined value. That is, the load limiting device may include a fluid device on which the tension or compressive forces act to actuate a brake acting on the rotary input when the tension or compressive forces acting on the output member exceed the predetermined value.

When the load acting on the output member exceeds a predetermined level while the actuator is receiving torque from the rotary input member, components restraining the actuating member can mechanically transmit force to friction devices acting on the rotary input member to cause a drag on the rotary input member, thereby limiting the force exerted by the output member.

The force limiting device may include at least one spring assembly preloaded to a desired operating force between the housing and the actuating member that allows efficient operation of the actuator when the load acting on the output member is below the predetermined value. When the load acting on the output member exceeds the predetermined value, the spring assembly collapses to allow the actuating member to transmit force and drag to the rotary input member.

Further in accordance with the invention, an actuator for converting a reversible rotating torque input into a linear force exerted by a force transmitting reciprocating output member of said actuator to thereby position an actuated element operatively attached to the reciprocating output member, said actuator comprising force limiting means for dissipating the input torque at a rotary input member within the actuator in a manner preventing additional movement of the actuated member whenever the reciprocating output member experiences tension or compressive forces in the direction of the linear motion that are above a predetermined value.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 1:
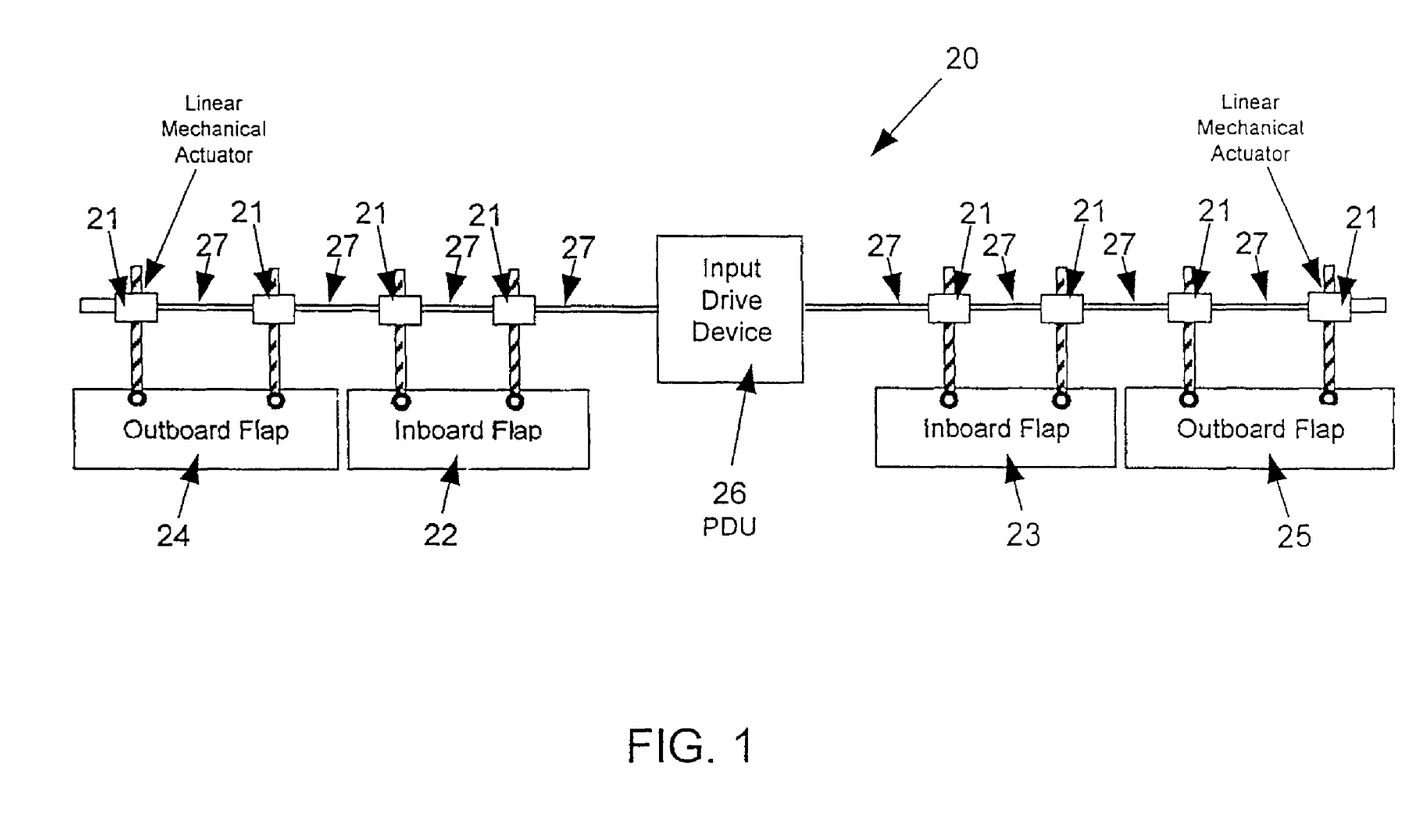
FIG. 1 is a schematic plan view of a flap control system for an aircraft.

Referring now in detail to the drawings and initially to FIG. 1, an exemplary flap system 20 can be seen to comprise eight flap actuators 21 for driving four flap panels 22-25. As will be appreciated, the number of flap panels and actuators may be varied for a given application, but usually there will be one or more flap panels on each wing and a like number on the other wing. Each flap panel may be driven by one or more actuators 21. In the illustrated embodiment, the inboard flap panels 22 and 23 and outboard panels 24 and 25 are all driven by two actuators each. It will also be appreciated that the principles of the invention may be applied to any system where linear mechanical actuators are used and load limiting is required, and the use herein of the term control surface panel is intended to encompass any type of controlled item including but not limited to; flaps, slats, doors, stabilizers and other similar devices. The following description, however, will refer to flap panels, it being appreciated that such description is equally applicable to any controlled item requiring load limiting.

Figure 2:
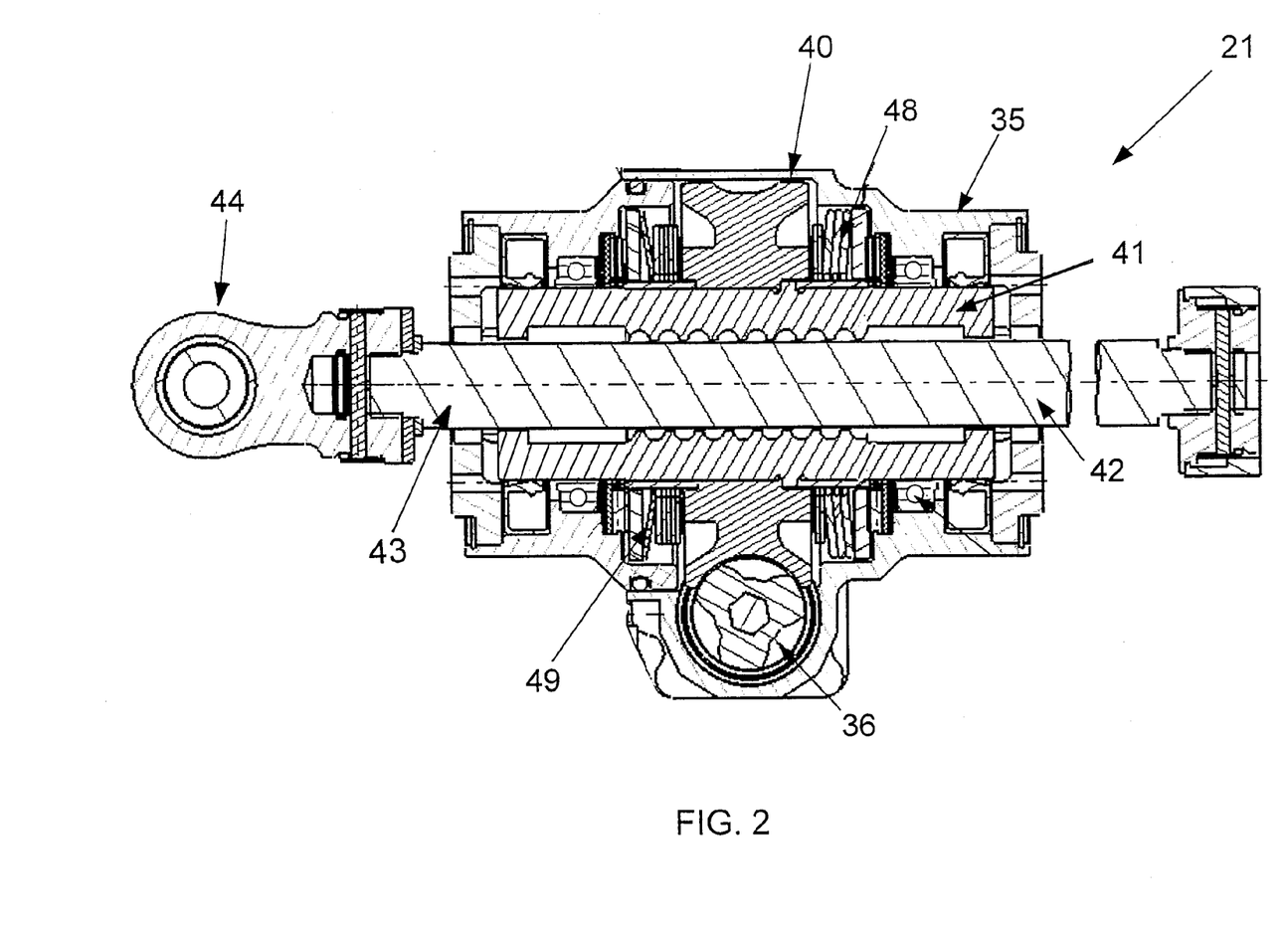
FIG. 2 is a cross-sectional view of an exemplary direct acting force limiting actuator according to the present invention.

Referring now to FIG. 2, each actuator 21 includes a housing 35 in which a rotary input member, in particular a worm shaft 36, is mounted for rotation. When the actuator is assembled into the system 20, the worm shaft 36 will be connected to a drive shaft 27 whereby it can be rotatably driven by the input drive device in one or either direction.

The worm shaft 36 is meshed with a worm gear 40 that is coupled to a ball nut 41 of a ball screw and nut assembly 42, whereby rotation of the worm gear effects rotation of the ball nut 41. The ball screw and nut assembly 42 may be of a conventional design, wherein recirculating balls causes a ball screw 43 to translate linearly. The ball screw 43 functions as the actuator output member and has provided on an end thereof a suitable coupling, such as the illustrated attachment eye 44, for connecting to the control surface panel. The ball nut 41 is supported for rotation in the housing by suitable bearings.

In the illustrated embodiment, the worm gear 40 is fixed to the ball nut 41 for common axial movement as well as rotary movement. In addition, the ball nut 41 is interposed between a compression load force trigger 48 and a tension load force trigger 49. The compression force and tension force triggers include one or more spring members, such as Belleville springs, through which compression and tension loads are transferred between the ball screw and the housing 35.

Figure 3:
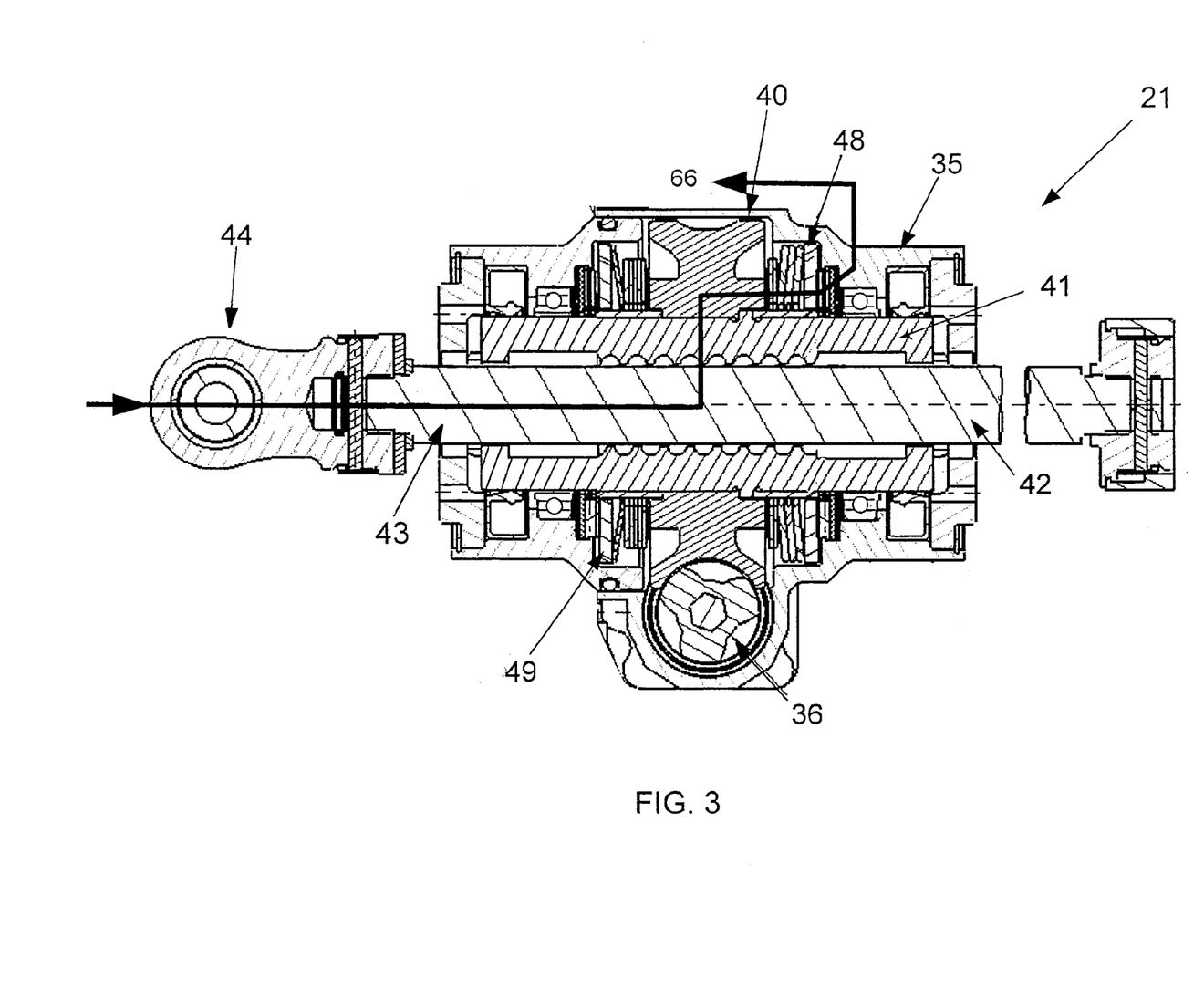
FIG. 3 shows a compression load path in the exemplary flap actuator.
Figure 4:
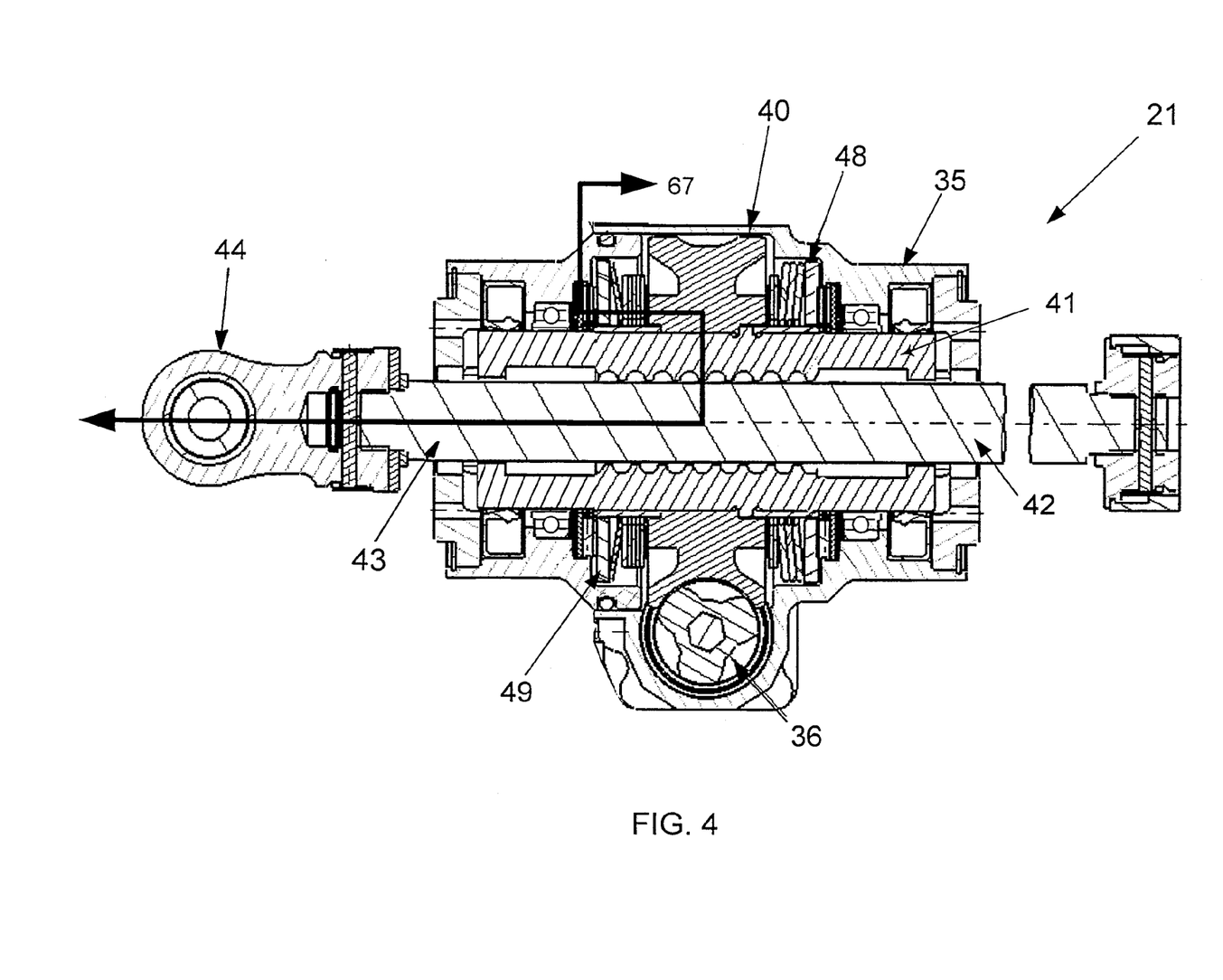
FIG. 4 shows a tension load path in the exemplary flap actuator.

During normal operating mode of the actuator, the worm gear torque is directly coupled to the nut 41 and drives the screw 43 as any other ball screw and nut system. The load path from the output screw fitting 44 to the actuator housing 35 for compression loads is shown at 66 in FIG. 3. FIG. 4 shows the tension load path at 67. The Belleville springs of the force triggers are loaded above the expected maximum operating load. Tension and compression loads are independently reacted so they normally act as spacers.

According to the present invention, the actuator 21 is provided with a direct acting load limiter feature. This feature arises from the worm gear 40 being held in alignment with the worm shaft 36 by the compression and tension force triggers 48 and 49 under normal operating design load. When the actuator load, however, exceeds the set point of either force trigger, the spring, or springs, of the force triggers collapse to allow the worm gear 40 to translate axially out of alignment with the worm shaft 36. This will cause the worm gear 40 to bind against and thus drag on the worm shaft 36 for dissipating input torque without creating significant output torque. In this regard, it is noted that the worm gear 40 and/or ball nut 41 are supported in the housing in a manner that allows for such shifting movement of the worm gear 40 relative to the worm shaft 36. In the illustrated embodiment, this can be effected by the bearings that support the ball nut 41 for rotation and also limited axial shifting movement.

Figure 5:
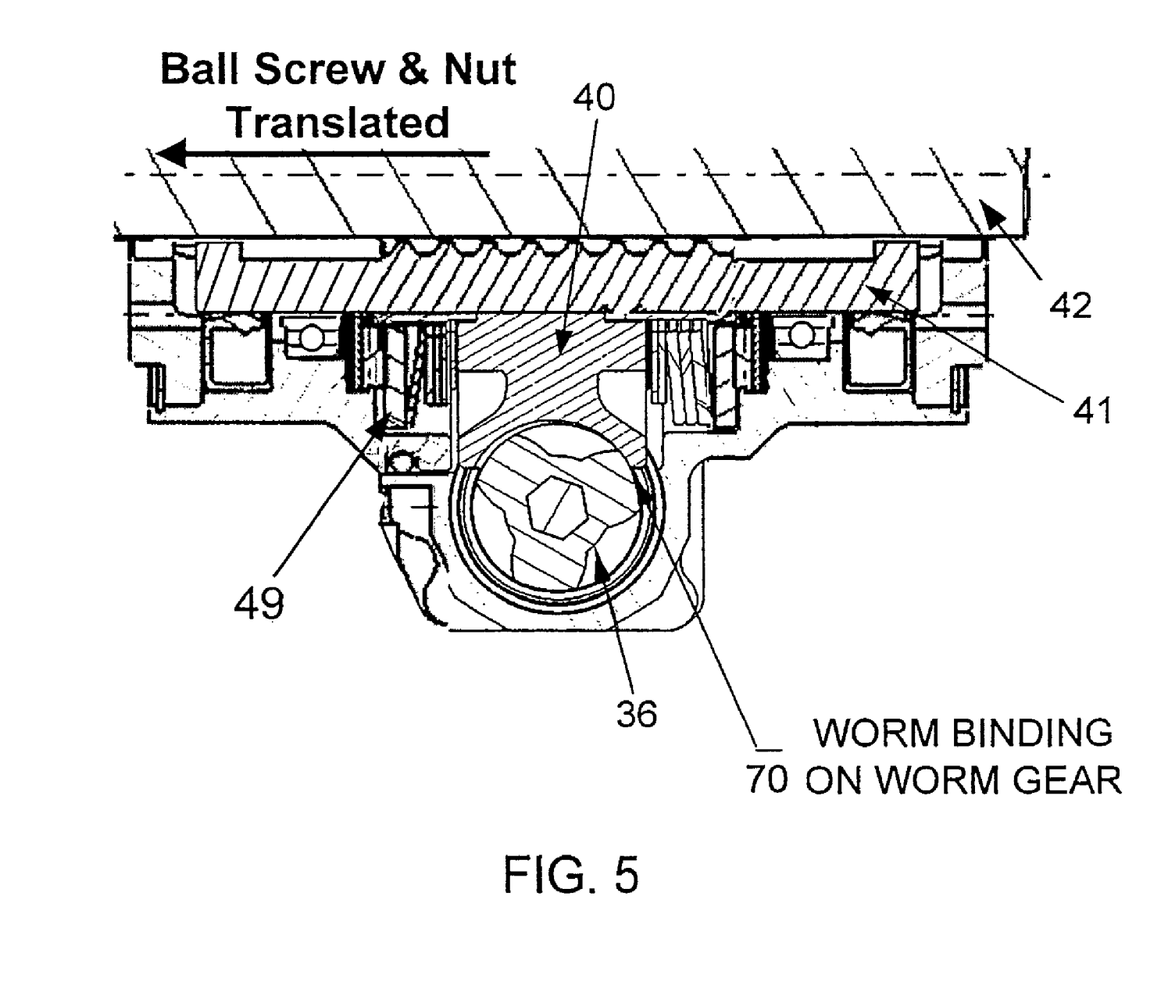
FIG. 5 is a fragmentary cross-sectional view of the direct acting force limiting actuator, showing the actuator in a force limiting mode.
Figures 6, 7:
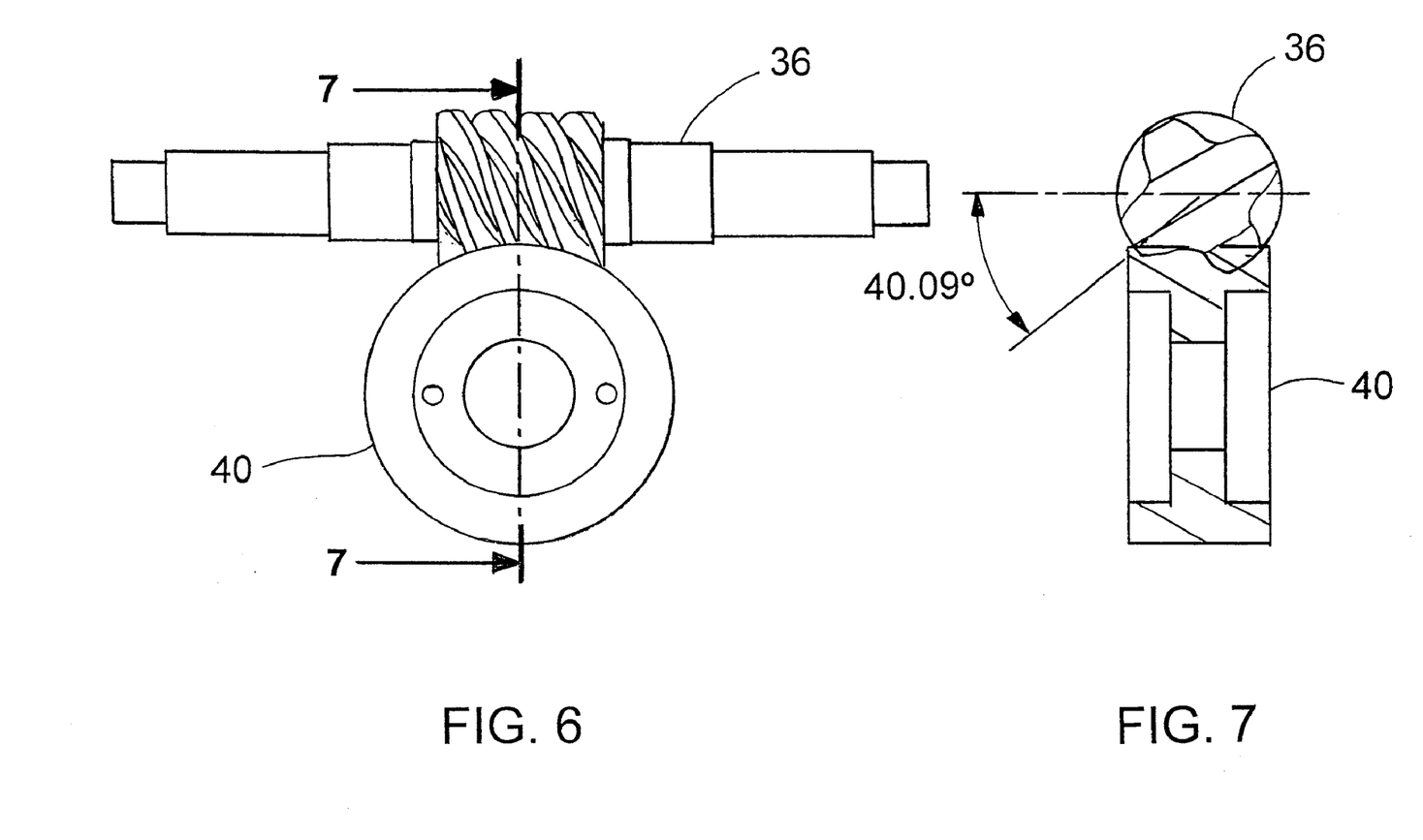
FIG. 6 is an elevational view of a worm shaft and worm gear employed in the actuator of FIG. 4.
FIG. 7 is a cross-sectional view of the worm shaft and worm gear of FIG. 7, taken along the line 7-7 of FIG. 6.

FIG. 5 shows at 70 the worm shaft 36 binding on the worm gear 40. Additional load on the actuator will increase the load at the shaft to gear interference and create more drag. When the screw load generates sufficient force on the worm shaft to gear interference the resulting resisting torque becomes sufficient to stall the input drive system of the PDU (FIG. 1). As will be appreciated by those skilled in the art, the balance of forces and torques will be dependent on the overall gear ratios, coefficients of friction and structural and actuator stiffness.

Thus, the actuator output force will cause significant drag on the rotary input shaft 36 rather than on the translating output member 43. Consequently, input energy is dissipated before the actuator gear train mechanical advantage amplifies the reaction forces. This enables significant weight reduction gains in relation to prior art load limiting schemes. In the past, the torque generated during a jam was consumed after the worm gear such that the high actuator gear ratio required the gears and load limiter to withstand very high lock-up torques. The high torque causes high loads that heretofore could only be managed with large heavy and complex designs.

The triggers 48 and 49 may be set with the same or with different load limit values between the retract (tension) and extend (compression) directions to meet specific system requirements. The load limiter also can be reset by either reducing the loads sufficiently or by reversing the direction of operation to back out of the load.

Standard Belleville springs have very high spring rates and have been selected for this embodiment, however, any spring type may be used by someone experienced in the art to meet specific system requirements.

Structurally this actuator construction places the smallest demands on the hardware after the worm shaft 36. Once the worm wheel 40 starts binding against the worm shaft it begins developing braking torque directly at the worm shaft such that most of the energy and torque is dissipated as friction between the worm and gear. The gear tooth bending and face contact loads and resulting torque into the ballscrew do not increase appreciably.

Figure 8:
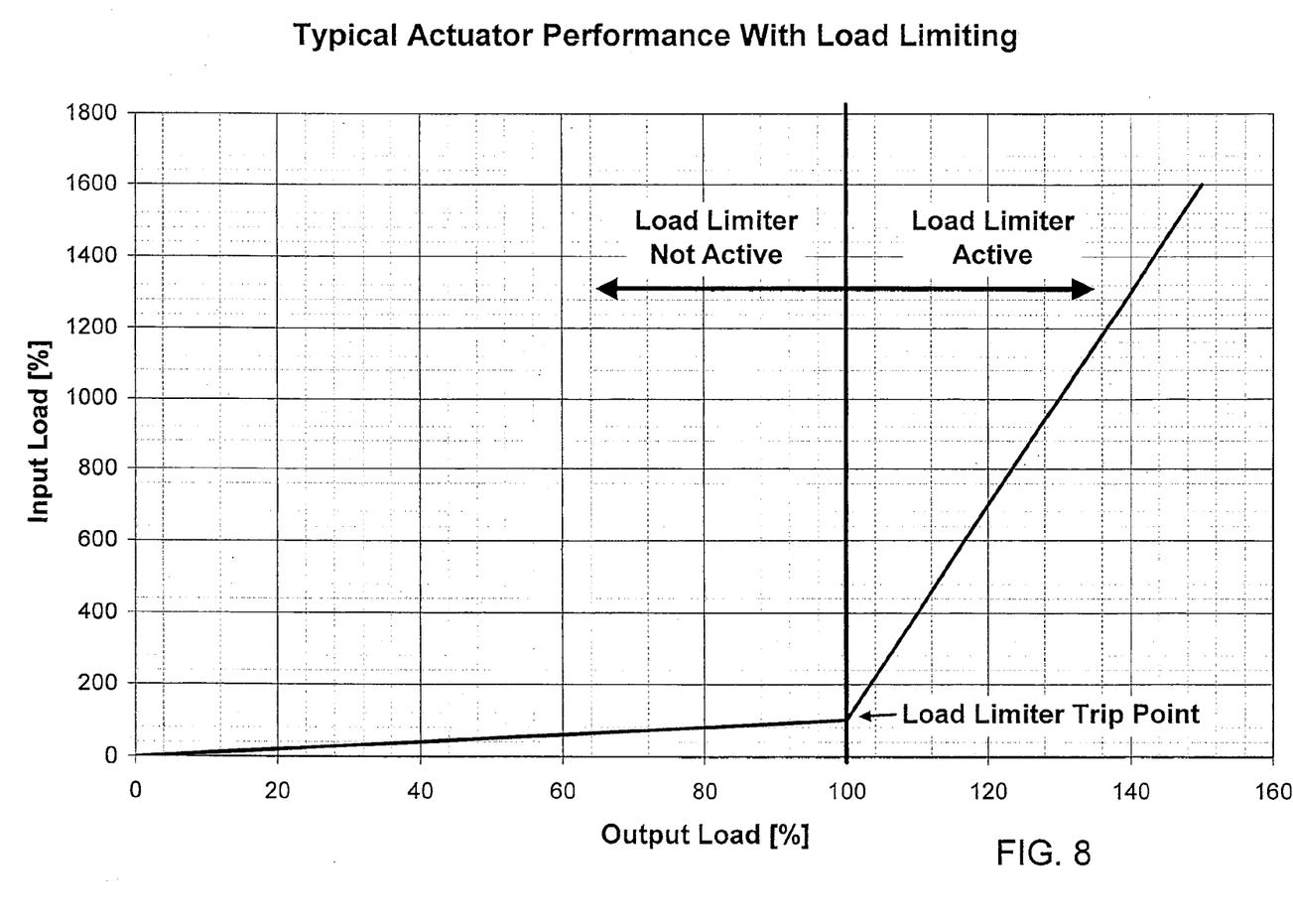
FIG. 8 is a graph showing typical actuator performance including normal and load limiter operation.

FIG. 8 shows a typical actuator load limiter gain based on typical coefficients of friction. A conservative estimate is the output force increases 30% above the force trigger set point for the exemplary system depicted in FIG. 1.

When the actuator load exceeds the preload force of the spring, the spring compresses causing the worm gear to displace axially. The displacement of the worm gear creates surface contact with the worm shaft. The friction force generated between the two contacting gears will be great enough to oppose the input torque to the worm shaft causing it to stop rotating.

Figure 9:
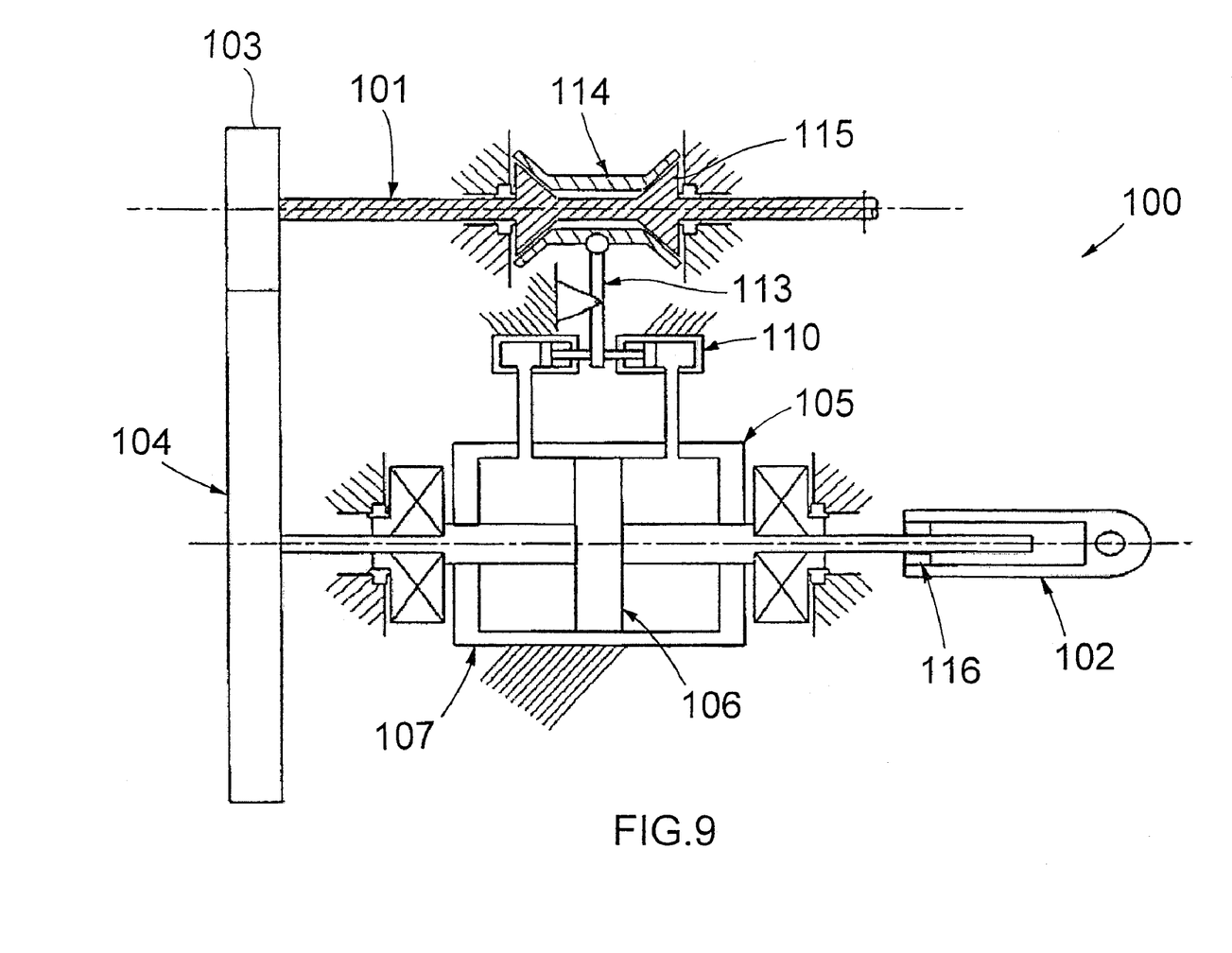
FIG. 9 is a schematic illustration of another actuator using a fluid operated force limiting device.
Figure 10:
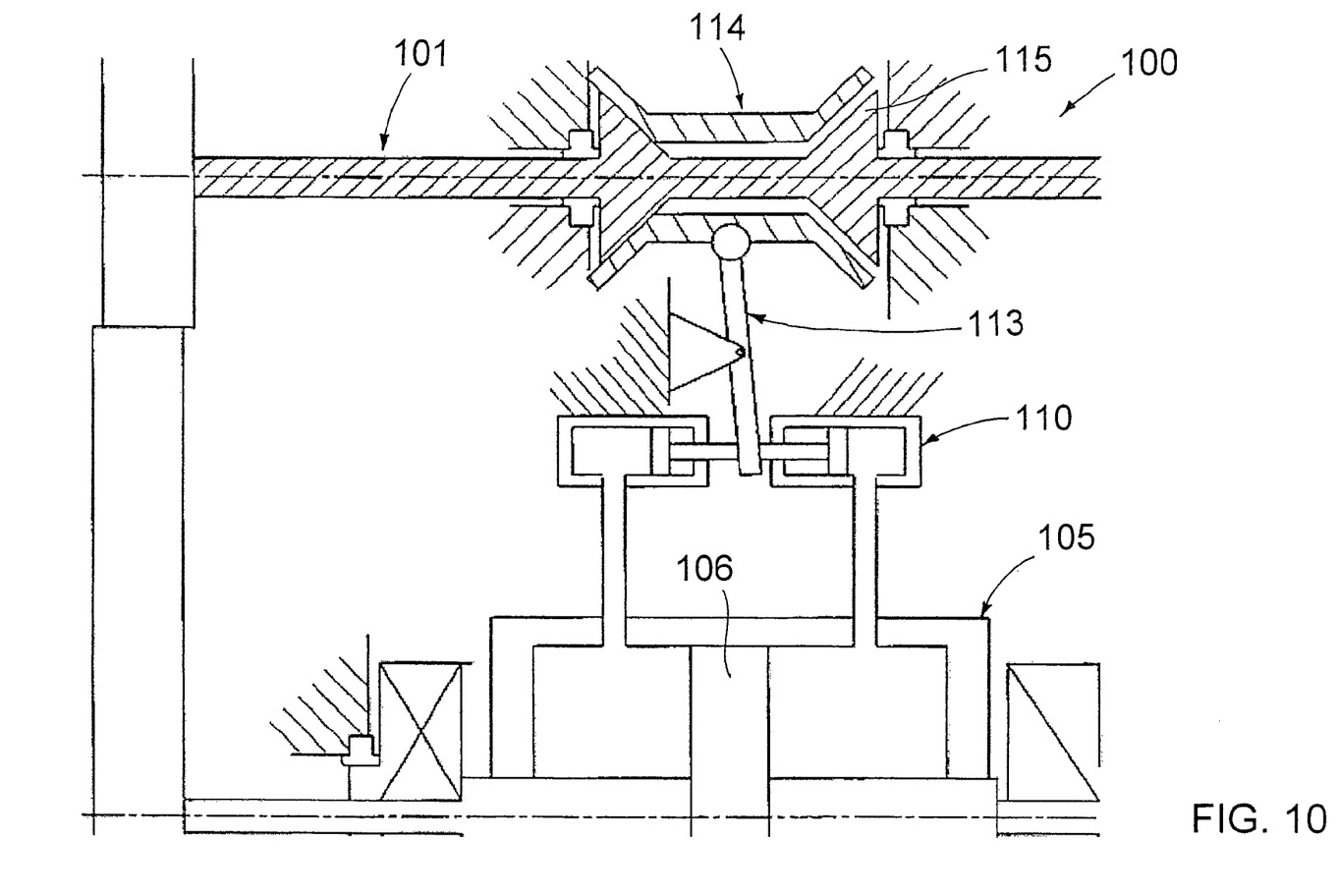
FIG. 10 is a schematic illustration similar to FIG. 8, showing the force limiting device in a force limiting mode.

Referring now to FIGS. 9 and 10, another force limiting technique according to the invention is illustrated. In the actuator generally indicated at 100, hydraulics are used to indirectly place a drag on a rotary input member 101 using the load acting on the output member 102. The input member may be a spur gear set 103 and 104, as shown in FIG. 9, or any other gear type, that connects the input to drive a ball screw assembly 116, substantially as above described in relation to the actuator shown in FIG. 2.

In the actuator 100, the load is applied by the linearly movable output member 102 through a piston and cylinder assembly 105 including a piston 106 that is movable in a cylinder 107. The movement of the piston is held centered in the cylinder 107, for example, by opposing pre-loaded spring elements (not shown) that define force triggers. When the load exceeds the trigger set point the piston displaces to cause fluid to move and displace a brake actuator member 110. In the illustrated embodiment the brake actuator member 110 includes a pair of opposed fluid actuators having the piston rods thereof connected to an actuator lever 113 that shifts a brake friction element 114 into engagement with a mating brake element 115 mounted to the rotary input member 101 for rotation therewith. This causes a braking force to be applied to the input member that will stall the input drive system. The force triggers can be provided at different locations, such as at the piston, or in conjunction with the brake lever. Cone friction brakes have been shown in this embodiment, however, any friction brake or other locking mechanism could be employed.

As will be appreciated by those skilled in the art, other actuator designs may make use of the above-described force limiting techniques. For instance, other types of rotary to linear conversion devices may be used, such as for example acme screws and planetary screws.

Although the invention has been shown and described with respect to certain illustrated embodiment, equivalent alterations and modifications will occur to others skilled in the art upon reading and understanding the specification and the annexed drawings. For example, although an embodiment of the invention directed to an aircraft flap is described, an actuator provided by the present invention may have other applications other than aeronautical applications. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention.

What is claimed is:

1. An actuator comprising:

an actuator housing;

a linearly translating output member restrained by an actuating member mounted for rotation about an axis within a housing;

a reversible rotary input member operatively coupled thru gears to the actuating member to cause the output member to translate along said axis in a direction dependent upon the direction of rotation of the rotary input member; and a force limiting device acting to dissipate input torque at the rotary input when axially directed tension or compressive forces acting on the output member are above a predetermined value;

wherein the actuating member is mounted in the housing for limited axial movement relative to the rotary input member.

2. An actuator according to claim 1, wherein reduction in load magnitude at the output member results in deactivation of the force limiting device.

3. An actuator according to claim 1, wherein the force limiting device creates a friction drag on the rotary input member to prevent axially directed tension or compressive forces experienced by the output member from back-driving the rotary input member.

4. An actuator according to claim 1, wherein the actuating member and the output member are respectively a ball nut and a ball screw of a recirculating ball screw and nut assembly.

5. An actuator according to claim 1, wherein the actuating member and the output member are respectively a lead screw and a ball nut of a recirculating ball screw and nut assembly.

6. An actuator according to claim 1, wherein the actuating member is biased by resilient forces to a centered position, and axial loads acting on the output member cause the actuating member to shift when axially directed tension or compressive forces acting on the output member are above a predetermined value.

7. An actuator according to claim 6, wherein shifting of the actuating member engages friction devices operative to apply a braking force to the rotary input member.

8. An actuator according to claim 7, wherein the rotary input device is worm shaft that is in mesh with a worm gear that causes rotation of the actuating member upon rotation of the worm gear, and the friction devices include portions of the worm shaft and gear that frictionally engage when the actuating member is shifted by axially directed tension or compressive forces acting on the output member that are above a predetermined value.

9. An actuator according to claim 7, wherein the tension or compressive forces acting on the output member act on a fluid device to cause the fluid device to actuate a brake acting on the rotary input when the tension or compressive forces acting on the output member exceed the predetermined value.

10. An actuator according to claim 1, wherein the force limiting device includes a fluid device on which the tension or compressive forces act to actuate a brake acting on the rotary input when the tension or compressive forces acting on the output member exceed the predetermined value.

11. An actuator according to claim 1, wherein when the force acting on the output member exceeds a predetermined level while the actuator is receiving torque from the rotary input member, components restraining the actuating member mechanically transmit force to friction devices acting on the rotary input member to cause a drag on the rotary input member, thereby limiting the force exerted by the output member.

12. An actuator according to claim 1, wherein the force limiting device includes at least one spring assembly preloaded to a desired operating force between the housing and the actuating member that allows efficient operation of the actuator when the load acting on the output member is below the predetermined value.

13. An actuator according to claim 12, wherein when the load acting on the output member exceeds the predetermined value, the spring assembly collapses to allow the actuating member to transmit force and drag to the rotary input member.

14. An actuator for converting a reversible rotating torque input into a linear force exerted by a force transmitting reciprocating output member of said actuator to thereby position an actuated element operatively attached to the reciprocating output member, said actuator comprising force limiting means for dissipating the input torque at a rotary input member within the actuator in a manner preventing additional movement of the actuated member whenever the reciprocating output member experiences tension or compressive forces in the direction of the linear motion that are above a predetermined value, wherein the force limiting means includes an actuating member mounted in a housing for limited axial movement relative to the rotary input member.

15. An aircraft flight control actuation system comprising at least one flight control panel and at least one actuator according claim 14 connected to the flight control panel for controlling the position of the flight control panel.

\* \* \* \* \*